Figure 1:
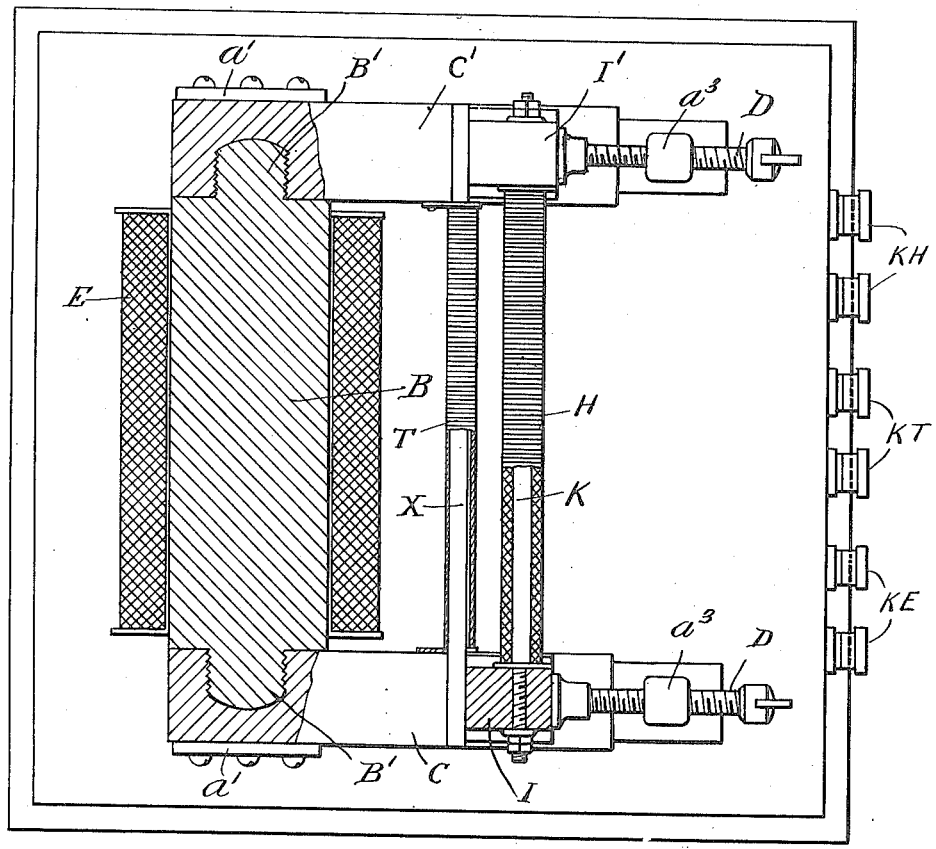

Oct. 14, 1924.

F. P. FAHY

PERMEAMETER

Filed May 11, 1918     2 Sheets-Sheet 1

1,511,595

INVENTOR
Frank P. Fahy
BY
Lewis J. Doolittle
ATTORNEY

Oct. 14, 1924.
F. P. FAHY
PERMEAMETER
1,511,595
Filed May 11, 1918 2 Sheets-Sheet 2
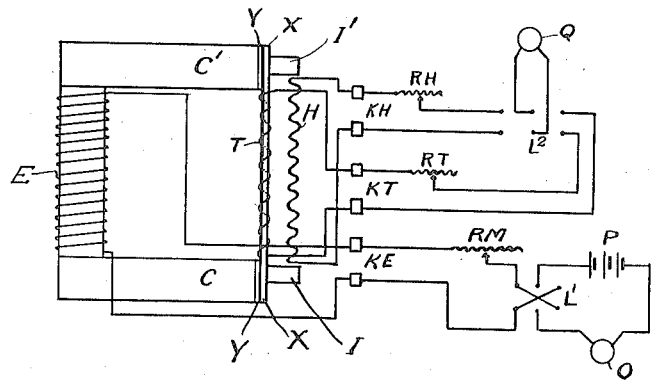
FIG.3.
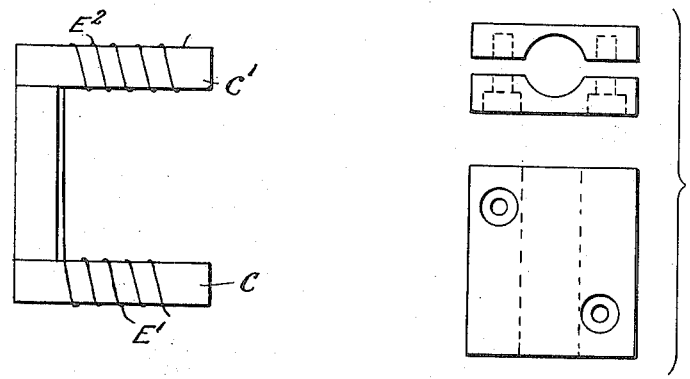
FIG.4.
FIG.5.

Patented Oct. 14, 1924.

1,511,595

UNITED STATES PATENT OFFICE.

FRANK P. FAHY, OF NEW YORK, N. Y.

PERMEAMETER.

Application filed May 11, 1918. Serial No. 233,932.

*To all whom it may concern:*

Be it known that FRANK P. FAHY, a citizen of the United States, and resident of the city, county, and State of New York, has invented certain new and useful Improvements in Permeameters, of which the following is a specification.

The object of my invention is to provide a practical and effective method of and apparatus for measuring or obtaining an indication of the magnetic characteristics of metallic bodies.

In carrying out my invention I provide a stationary core of magnetic material, which may be laminated if the conditions of use make this desirable but for most purposes need not be laminated. This core is shaped to provide a magnetic circuit which is completed through an elongated air gap included between the poles of this core. In the use of the instrument this elongated air gap is bridged by a test body, the magnetic characteristics of which are to be measured. Associated with the core of the apparatus are provisions for subjecting it, and the body under test, to a magnetomotive force and for inductively measuring the magnetic effects produced in the body under test and in that region of the air path which parallels the test body and is in proximity thereto.

The means employed in practice for subjecting the core to a magneto-motive force and for measuring the magnetic effects produced in a metallic magnetic test body bridging the air gap and the magnetic effects produced exterior to that body, comprise a magnetizing winding connected to a suitable source of electro-motive force and two induced current windings, the terminal leads of each of which latter windings may be connected to a suitable galvanometer or other indicating instrument.

My invention also includes effective means for automatically eliminating, for all practical purposes, such errors in measurement as ordinarily arise when the seat of magnetomotive force is located externally to the test body and which are due, first, to the presence of magnetic joints and, second, to the necessarily variable inductive effects along the length of the test body bridging the elongated air gap, when such variable effects are not due to the non-uniformity of the test body but exist solely by reason of the variation of the magnetizing force along the length of this body.

The various features of novelty which characterize my invention are pointed out with particularity in the claims annexed to and forming a part of this specification. For a better understanding of the invention, however, and the advantages possessed by it reference will be had to the accompanying drawings and descriptive matter, in which I have illustrated and described some of the possible various embodiments of my invention.

Figure 2:
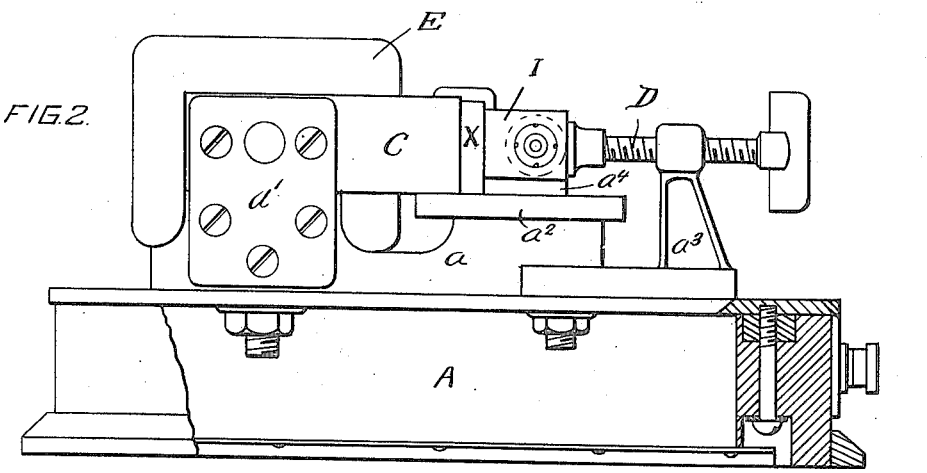

In the drawings Fig. 1 is a plan view, partly in section, of a preferred form of apparatus embodying my invention. Fig. 2 is an end elevation of the apparatus shown in Fig. 1. Fig. 3 is a diagrammatic representation of the apparatus shown in Fig. 1, with certain preferred external electrical circuit connections thereto, and also illustrates the use of non-magnetic spacers to produce high reluctance between the core portion and the test body. Fig. 4 is a diagrammatic representation showing the application to the core of an instrument such as shown in Fig. 1 of a modification of the winding arrangement which may be employed. Fig. 5 is a detail view of a special form of pole face attachment which adapts the instrument shown in Fig. 1 to the testing of round rods.

In the proposed embodiment of my invention, as illustrated in Figs. 1 and 2, the base of a machine is shown at A, upon which is mounted the magnetic core of the apparatus. This magnetic core, for convenience in manufacture, may be made in separate portions secured together as shown. The yoke or cross-bar B of the magnetic core, which is of U-shape, may be formed at its ends with threaded portions B' screwed into threaded sockets formed in the extended transverse core portions forming arms C and C'.

As shown, the core arms C and C' are each mounted upon a specially shaped supporting member "$a$" of non-magnetic material, which is secured to the platform or base A, the core arms C and C' being secured to "$a$" by bracket members $a'$ and $a^2$, which are fastened both to the supporting member "$a$" and to the core arms C and C'.

The brackets $a^2$, which are preferably made of highly magnetic material, are secured respectively to the outer portions of the core arms C and C' and the supporting brackets "a" and provide an additional magnetic contact surface for the body under test. When such test body is, for instance, made of laminated sheets where sufficiently good contact is not provided by the face of the sheet in contact with the pole faces it is necessary to provide for edge contact so that all the sheets may be in contact (magnetic) with the core pieces.

The brackets $a^3$ are secured to the base A adjacent the ends of the core pieces C and C' and are provided with threaded sockets for clamping screws D, by means of which the body X, together with iron blocks I and I' and the test coils, may be clamped against the core arms C and C' or against pole pieces secured thereto, as hereafter explained. In Figs. 1 and 2 a test piece or body X is shown clamped against the ends of the core arms C and C'.

The yoke portion B of the core of the instrument, as shown in Figs. 1 and 2, is surrounded by a magnetizing coil E. The test body X is surrounded by a test coil T. The end flanges of the non-magnetic form bearing this test coil T are secured to the core arms C and C'. H represents a uniform winding of one or more layers wound upon a solid or hollow non-magnetic core K, which is attached at its ends to iron pole pieces I and I', which are preferably made of soft iron. The outer ends of the core K are reduced in diameter and threaded and pass through slightly larger holes drilled through the blocks I and I', being secured thereto by means of nuts and spring washers. These spring washers permit of slight twisting of the iron blocks I and I' in order that good contact between these blocks and the test body X may be secured in the event that the test body is not entirely straight.

As shown in Figs. 1 and 2, when the test body X is inserted in the test coil T, one end of each of these soft iron blocks I and I' is brought into contact with and clamped against that face of the test body which is opposite to the face making contact with the ends of the core portions C and C'.

To the iron blocks I and I' are affixed supporting blocks $a^4$ of non-magnetic material, such as brass, which rest on the supporting brackets $a^2$, retaining the blocks I and I' at a definite distance from $a^2$ and preventing magnetic contact therewith. The soft iron pole pieces I and I' are so designed that the periphery of their respective sections are large with reference to their length. In this way the form of the blocks provides a self-demagnetizing factor which causes the induction in the pole pieces I and I' to be approximately proportional to the magnetizing force to which they are subjected in the operation of the apparatus and also results in these pole pieces displaying practically zero residual induction when the magneto-motive force developed by current in the magnetizing coil is reduced to zero.

The ends of the different windings are connected, as shown, to suitable binding posts mounted on the base A, (see Figs. 1 and 3).

KE represent the binding posts to which the magnetizing winding E is connected; KT the binding posts to which the test winding T is connected and KH the binding posts to which the test winding H is connected.

In Fig. 3 I have illustrated an advantageous arrangement of external instrument and circuit connections to the binding posts of the magnetic testing instrument proper. As shown in this figure, RM represents a variable resistance, O an ammeter, P a source of electro-motive force and L' a reversing switch, all so connected to the binding posts KE that the resistance M, ammeter O and source of current P may be connected in series with the magnetizing winding E, with the current flowing in either direction through the winding E from the source P. The binding posts KT and KH are connected to a suitable galvanometer or other indicating instrument through the respective regulating resistances RT and RH, by means of the switch $L^2$ in such a manner that the test circuit embracing the coil T and the test circuit embracing the coil H may, at will, be connected to the indicating instrument.

In the use of the apparatus illustrated for measuring or determining the magnetic characteristics of the object or test body X, which spans the end faces of the core portions C and C', the purpose is to measure the change in magnetic induction in lines of force which is set up in the test body when the magnetizing current, or magneto-motive force developed by this current, is changed in any way and also to measure the change in magnetic induction which takes place in that air region included within the turns of the coil H, which latter coil extends between the iron blocks I and I', when these blocks are in contact with the respective ends or end regions of the test body.

In practical use it is often desirable to determine the relative reluctance of a large number of test bodies as compared with that of a standard specimen of the same kind. Therefore a specimen which has been ascertained by mechanical test or otherwise to be suitable for the particular purpose in hand may be subjected to the action of the apparatus and its reluctance thereby determined. The test specimens may then be subjected in turn to the action of the apparatus and may be accepted or rejected according to the extent of which their reluctances differ from the standard specimen.

In measuring the magnetic properties of an object X, for example, as shown in Figs. 1 and 2, I first clamp this object snugly in place, interposing between the clamp screws D and the ends of the test body X the iron blocks I and I' supporting the coil H. I then manipulate the variable resistance RM to obtain the current in the magnetizing coil E giving the desired (approximate) magneto-motive force when the switch L' is closed. I then manipulate the switch L' to reverse the direction of current flow through the winding E several times so as to bring the test body into a cyclic state magnetically. A reading is then taken of the deflection of the measuring instrument Q when this instrument is connected first to the binding posts KT, (and hence in series with the coil T), and then to the binding posts KH, (and hence in series with the coil H), the magnetizing current in the coil E being either reversed or changed in some manner in making each reading. When the measuring instrument is properly calibrated in accordance with the electrical constants of the two circuits, which calibration is respectively adjusted by manipulation of the adjusting resistances RT and RH, the measuring instrument will indicate the integrated electro-motive force generated in the coils connected in series therewith caused by the flux changes therethrough resulting from changes in the magnetizing current. From the integrated electro-motive force indicated when the measuring instrument is connected with the coil T, the average flux or induction in the test body X may be measured and from the integrated electro-motive force, indicated when the measuring instrument is connected to the coil H, the average flux or induction in the air region adjacent to the test body X may be measured. I have found this latter flux or induction a suitable and satisfactory measure of the difference in magnetic potential existing between the ends of the test body X, since the magnetic resistance of the iron blocks I and I' is practically zero. Since the coil H, which measures this magnetic potential difference, encircles air or other non-magnetic matter only, the average magnetic potential drop per unit length of the winding H is equal to the average magnetizing force acting on the test body X. Hence the two readings observed, when the measuring instrument is connected to the coils T and H separately, are respectively proportional to the changes in magnetic induction and magnetizing force.

In U. S. Patent No. 1,196,223, granted to the writer, a method of obtaining a measure of induction and magnetizing force in two symmetrical magnetic circuits having a core portion in common is described, in which the test coil T encircles, as here, the test body X and a test coil HA, occupying a symmetrically similar position to the test coil T, encircles air only. This method of measuring magnetic properties, while very accurate, has the serious disadvantage that a compensation is necessary to correct for the unequal magneto-motive force drops which exist in corresponding parts of the symmetrical circuits, between the common source of set-up magneto-motive force and the regions or bodies encircled by the test coils. These unequal magneto-motive force drops are in part found in the core arms C and C' and in part in the contact conditions existing between the ends of the core arms and the test body on that side to which the test body is applied. The method disclosed in the present application is intended to and does render this compensation unnecessary, since the same core portions throughout carry, in its entirety, the total flux passing through the coils T and H and, as the iron blocks I and I', as explained above, are formed so as to have a high self-demagnetizing factor, the magnetic potential between the ends of the coil H is equal to the magnetic potential between the ends of the test body X, since this self-demagnetizing factor renders the effect of the magnetic joint between I and I' and the respective ends of the test body negligible. In applying these blocks I and I' directly to the ends or contact portions of the test body the influence of the magnetic joints between the test body and the core portions C and C' does not, as is apparent, enter into the measurement problem, as these joints are common to both paths of the flux through the test body X and the test coil H. The ends or contact portions of the test body will be understood as referring to the portions or regions of the body at the pole faces, which portions are not necessarily the actual ends of the test body, which may project at either or both ends beyond the pole faces.

While the arrangement of magnetizing and test coils illustrated in Figs. 1 and 2 and diagrammatically in Fig. 3 is that which I prefer to employ in the practical use of my invention, it will be obvious to those skilled in the art that the magnetizing winding may be arranged in a different manner and in Fig. 4 I have illustrated a different winding arrangement which I may employ. The winding arrangement shown in Fig. 4 differs from that shown in Figs. 1 and 2 primarily in the fact that the single magnetizing coil E is replaced by the two similar magnetizing coils E' and E² connected in series and located one on each of the core portions C and C'. The positions of the test windings T and H remain unchanged.

In the instrument described and illustrated in Figs. 1, 2, 3 and 4, upon the application of magneto-motive force, by means of current in the magnetizing coils E or the combined coils E' and E², the induction or flux along the lengths of the coils T and H is not uniform, but varies, being at a maximum in the regions near the ends of such coils and minimum midway between the ends. This variation is, however, considerably reduced, as compared with that which would occur in their absence, by the presence of the blocks I and I', which cause a magneto-motive force drop at the contact portions of the core portions due to the flux dissipated by such blocks. Again, since average values only are measured and since the average variation from the mean is practically similar for both coils T and H, such variations as do exist do not have a marked effect on the accuracy, as is shown by comparison of the readings of induction and magnetizing force obtained with the method described with those obtained according to methods wherein the test body is brought to uniformity from end to end by means of compensating methods. However, where greater uniformity is sought it may be obtained to a marked degree by interposing between the ends of the test body and the faces of the core portions C and C', spacers Y of non-magnetic or poorly magnetic material, such as brass, as shown in Fig. 3. The same end may be reached, however, by tapering the core portions C and C' at their ends so as to increase the magnetic reluctance of the portions of the core immediately adjacent to the test body and to reduce the area of contact between the core portions and the test body.

Reference is made above to the flux dissipated by the blocks I and I'. Whenever the flux in any magnetic circuit is not uniform from point to point, magnetic leakage occurs and so-called free magnetic poles are created where the leakage flux leaves and reenters the circuit. The leakage flux thus arising is known as free magnetism. Free magnetic poles may be created by non-uniform magnetization, inhomogeneity of material, change in section, the presence of other magnetic bodies either in contact or in close proximity, joints, etc. Magnetic circuits in which free magnetism, and therefore magnetic leakage, does not exist rarely occur. In the type of magnetic circuit shown in Figs. 1 and 2, leakage occurs at a number of points. A measure of the leakage between any two points determines the magnetic potential between such points. However, if pronounced leakage occurs at the same time between a number of different points in a circuit, it introduces a very disturbing factor in measurement. But, if the configuration of the magnetic circuit is purposely made such as to largely concentrate and direct the leakage flux at definite points between which it is desired to measure the magnetic potential, such measurement is more readily and accurately made.

While in the magnetic circuit of Figs. 1 and 2, free magnetic poles exist in any event at the contact faces of C and C' due to the presence of joints and the usual change in section due to the test body itself, the blocks I and I' by dissipating flux concentrate the free magnetic poles at definite and convenient points. Concentrating leakage flux by thus "loading" the magnetic circuit brings about at the same time the augmentation of such flux, and facilitates its measurement by not requiring too delicate detecting instruments. It is not essential that I and I' be in perfect contact with the body under test to concentrate and augment such flux.

The instrument described herein is capable of use for many different purposes. It may be employed to determine the magnetic characteristics of materials intended for use where their magnetic properties are the important characteristics. For instance, it may be used to determine the permeability, residual induction and coercive force of magnetic materials. The apparatus is well adapted and was in part devised for use in determining such physical properties as elasticity, ductility and tenacity, and that somewhat indefinite property called hardness, in so far as these properties are varied in a metallic body of given basic chemical composition by the heat treatments to which it has been subjected.

The apparatus may be used also to determine the existence and, to some extent, the character of welds, flaws, cracks, laminations, pipes, air holes and blow holes in rolled, cast or forged metallic bodies; to determine character and extent of case hardening, to indicate differences in magnetic characteristics and mechanical properties of objects of different basic chemical composition, and to roughly indicate the chemical composition of ferruginous substances containing elements affecting their magnetic characteristics, such as carbon, manganese, silicon, nickel, tungsten, vanadium and chromium.

To accommodate and adapt it to the different uses to which a single instrument may be put, I prefer to provide for the use of special pole faces of magnetic material to suit the form and characteristics of the pieces to be tested. In testing round rods, for instance, I attach to the ends of the rods the special ends shown in Fig. 5, which fit accurately to the pole face and against the back end of which the iron blocks I and I' are applied. These bushings are not permitted to come into contact with the bracket members $a^2$. These two halves of these ends or bushings are split so as to make magnetic contact with each other only through the medium of the test rod, being affixed to the rod and each other through the medium of the brass screws.

While I have shown and described the best forms of my invention now known to me, as determined by my experiments thus far made, it will be apparent to those skilled in the art that changes may be made in the mode of operation and forms of apparatus disclosed without departing from the spirit of my invention, and that certain features of the invention may sometimes be used without a corresponding use of other features.

What I claim is:—

1. The method of determining the magnetic properties of a magnetic or magnetized object, which consists in subjecting the object to a changing magneto-motive force, adapted to generate a flux in said object, fitting to the end regions of such object, contact bodies, magnetic in character, forming a part of a shunted flux path external to the object and adapted to augment the flux in said external path and determining the flux relation in said path and object.

2. The method of determining the magnetic properties of a magnetic object, which consists in subjecting the object to a changing magneto-motive force adapted to generate a flux in said object, fitting to such object magnetic contact bodies adapted to cause part of the flux when developed to pass through an external path formed adjacent to the object between said contact bodies, and determining the flux relation in said path and object.

3. The method of determining the magnetic properties of a magnetic object, which consists in utilizing a changing magneto-motive force to create a changing magnetic flux, subjecting said object to the effects of this flux, measuring the integrated electro-motive force induced in a coil surrounding such object and also measuring the integrated electro-motive force induced in a coil exterior to the object and having its ends affixed to metallic magnetic contact pieces in magnetic contact with the end regions of such object under test.

4. In a device of the class described, in combination, means for subjecting a test body to a changing magneto-motive force to generate a flux, means for causing a part of the flux so generated to pass through the test body and a part to pass through a path composed of a plurality of mediums having different reluctance characteristics located external to and adjacent said test body, and means for measuring the flux in each of said paths.

5. In a device of the class described, in combination, a magnetizing coil provided with a magnetic core, magnetic contact blocks provided with means for clamping the end contact portions of a test body between said blocks and the end portions of said magnetic core, a coil surrounding said test body, a second coil positioned adjacent to said test body, and means for measuring the electro-motive force induced in said coils.

6. In a device of the class described, in combination, a magnetizing coil, provided with a magnetic core, magnetic contact blocks provided with means for clamping the end contact portions of a test body between said blocks and the end portions of said magnetic core, non-magnetic separators interposed between the said end contact portions of the test body and the end portions of said core, a coil surrounding said test body, a second coil positioned adjacent to said test body, and means for measuring the electro-motive force induced in said coils.

7. In a device of the class described, in combination, a magnetizing coil provided with a magnetic core, means for clamping the end contact portions of a test body in contact with the end portions of said magnetic core, means adapted to divert and augment a part the flux passing through the said end contact portions of the test body through a path external to and adjacent said test body, and means for measuring the flux in each of said paths.

8. In a device of the class described, in combination, a magnetizing coil provided with a U shaped magnetic core, means for clamping the end contact portions of a test body in contact with the end portions of said magnetic core, means adapted to divert and augment a part of the flux passing through the said end contact portions of the test body through a path external to and adjacent said test body, and means for measuring the flux in each of said paths.

9. In the method of determining the magnetic properties of a magnetic or magnetized body, the steps which include subjecting the object to a given changing magneto-motive force adapted to generate a flux in said body, fitting to the end regions of such body contact bodies magnetic in character forming a part only of a leakage flux path adapted to augment the flux in said path and measuring the flux in said path.

10. In the method of determining the magnetic properties of a magnetic or magnetized body the steps which consist in subjecting the body to a given changing magneto-motive force adapted to generate a flux in said body, fitting to the end regions of such body contact bodies magnetic in character forming a part of a shunted flux path composed of a plurality of mediums external to the object and adapted to augment the flux in said path and measuring the flux in said path.

11. In the method of determining the magnetic properties of a magnetic body the steps which comprise subjecting the body to a given changing magneto-motive force adapted to generate a flux in said body, fitting to said body magnetic contact bodies adapted to cause part of the flux when developed to pass through an external path composed of a plurality of mediums and formed adjacent to the body between said contact bodies and determining the flux in said path.

12. In the method of determining the magnetic properties of a portion of a magnetic body between two given points the steps which include subjecting said body to a changing magneto-motive force, fitting to the said body at the said points contact bodies magnetic in character forming a part only of a leakage flux path and determining the intensity of flux in said leakage flux path.

13. In the method of determining the magnetic properties of a portion of a magnetic object between two given points the steps which include subjecting the said object to a changing magneto-motive force, fitting to the said body at said points contact bodies magnetic in character forming a part of a shunted flux path external to the said portion, said flux path being composed of a plurality of mediums and determining the intensity of flux in said shunted flux path.

14. In the method of comparing the reluctance of a test body between any two points with the reluctance of a standard specimen, the steps which consist in subjecting the test body to a changing magneto-motive force adapted to generate a flux in said body, fitting to the said body at said points contact bodies magnetic in character forming a part of a leakage flux path and measuring the flux in said path.

15. The method of measuring the magnetic potential of a variably magnetized body between any two points which consists in fitting to such body at such points contact bodies, magnetic in character, forming a part only of a leakage path adapted to restrict the magnetic leakage to a region adjacent to the magnetized body and measuring the electro-motive force induced in a coil arranged in such path.

16. The method of measuring the magnetic potential of a variably magnetized body between any two points (regions) which consists in fitting to the body at the said points contact bodies, magnetic in character adapted to augment the leakage flux between the said points and to concentrate such flux in a non-magnetic path between the said two contact bodies and measuring the electromotive force induced in a coil arranged in said path.

17. The method of measurng the magnetic potential of a variably magnetized body between any two points which consists in fitting to the body at the said points contact bodies, magnetic in character, adapted to increase the leakage surface at each of the said points and measuring the leakage in the non-magnetic path between the two contact bodes.

18. The method of measuring the magnetic potential of a variably magnetized body between any two points which consists in fitting to the body at the said points contact bodies, magnetic in character, adapted to restrict the leakage flux to a non-magnetic path of definite length and reluctance and measuring the electromotive force induced in a coil arranged in said path.

19. In a method of measuring the magnetic potential between two points of a magnetic circuit the steps which consist in variably magnetizing said magnetic circuit creating free magnetic poles at said points and measuring the flux between such poles.

20. In the method of determining the magnetic properties of a magnetic object, the steps which consist in subjecting the object to a changing magnetomotive force adapted to generate a flux in said object, placing bodies magnetic in character in such relation to said object as to cause part of the flux to pass through a partially non-magnetic external circuit formed adjacent to the object between said bodies and determining the flux in said circuit.

21. In the method of measuring the magnetic potential between any two points of a body, the steps which consist in augmenting the free magnetism at said points and measuring the leakage flux between said points.

Signed at the city, county and State of New York, this May 1, 1918.

FRANK P. FAHY.